United States Patent [19]

Iino

[11] Patent Number: 4,908,611
[45] Date of Patent: Mar. 13, 1990

[54] HEAD-UP DISPLAY APPARATUS FOR AUTOMOTIVE VEHICLE

[75] Inventor: Tadashi Iino, Susono, Japan

[73] Assignee: Yazaki Corporation, Japan

[21] Appl. No.: 384,083

[22] Filed: Jul. 24, 1989

Related U.S. Application Data

[63] Continuation of Ser. No. 169,428, Mar. 17, 1988, abandoned.

[30] Foreign Application Priority Data

Mar. 17, 1987 [JP] Japan .................................. 62-60144

[51] Int. Cl.⁴ .............................................. G09G 1/16
[52] U.S. Cl. ..................................... 340/705; 340/980; 350/174; 353/13; 353/14
[58] Field of Search .................... 340/97, 98, 705, 980; 353/13, 14; 350/174; 358/25, 93, 103, 104

[56] References Cited

U.S. PATENT DOCUMENTS

| | | | |
|---|---|---|---|
| 3,709,589 | 1/1973 | Lamb et al. | 353/13 |
| 4,582,389 | 4/1986 | Wood et al. | 350/174 |
| 4,630,904 | 12/1986 | Pastore | 340/98 |
| 4,635,033 | 1/1987 | Inukai et al. | 340/705 |
| 4,636,782 | 1/1987 | Nakamura et al. | 340/705 |
| 4,639,106 | 1/1987 | Gradin | 353/13 |
| 4,711,544 | 12/1987 | Iino et al. | 353/14 |
| 4,742,389 | 5/1988 | Schiffman | 340/980 |
| 4,787,711 | 11/1988 | Suzuki et al. | 350/174 |
| 4,804,836 | 2/1989 | Iino | 340/705 |
| 4,831,366 | 5/1989 | Iino | 340/705 |
| 4,837,551 | 6/1989 | Iino | 340/705 |

FOREIGN PATENT DOCUMENTS 2123974 2/1984 United Kingdom ................ 340/705

*Primary Examiner*—David K. Moore
*Assistant Examiner*—M. Fatahiyar
*Attorney, Agent, or Firm*—Wigman & Cohen

[57] ABSTRACT

To display various vehicle images or TV programs to a driver taking a front seat or to a passenger taking a rear seat by a head-up display apparatus for an automotive vehicle, the head-up display apparatus comprises a driver half mirror disposed on the dashboard, a passenger mirror disposed on a console box disposed between two front seats, and a projector unit having a CRT and a pivotal reflecting mirror driven by a motor from a first driver position to a second passenger position or vice versa in response to control signals from a control circuit.

8 Claims, 5 Drawing Sheets

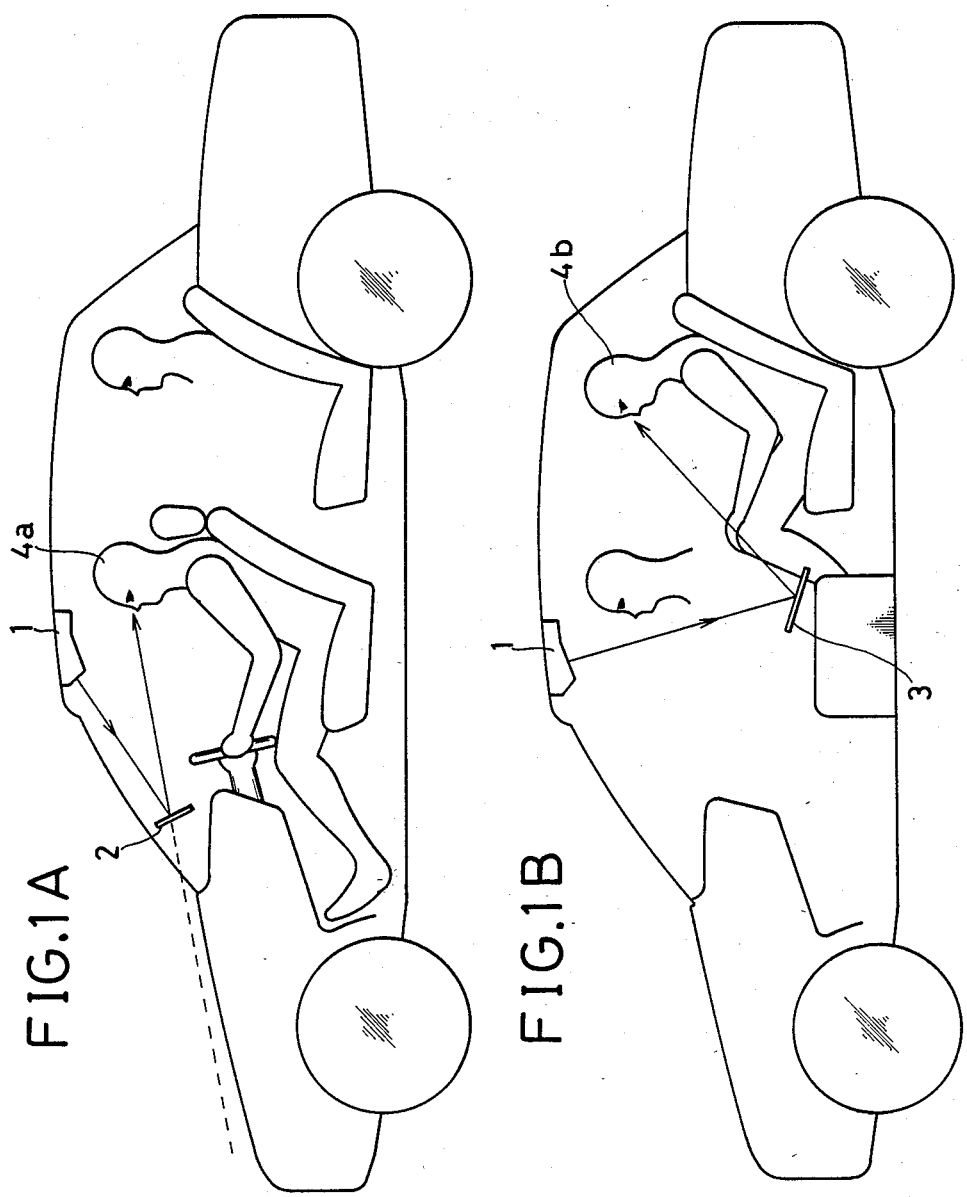

HEAD-UP DISPLAY APPARATUS FOR AUTOMOTIVE VEHICLE

This is a continuation of co-pending application Ser. No. 169,428, filed on Mar. 17, 1988, now abandoned.

BACKGROUND OF THE INVENTION

1. Field of the Invention

The present invention relates to a head-up display apparatus for an automotive vehicle, and more specifically to an apparatus for displaying various vehicle related information on a half mirror disposed on the vehicle dashboard, so that the driver can see displayed vehicle information, while seeing external views through the windshield.

2. Description of the Prior Art

Recently, a display apparatus called head-up display has been used for an automotive vehicle, in which a display unit is disposed on the dashboard so that the driver can see vehicle information while seeing the outside view through the windshield during vehicle running. The display unit is a half mirror or a hologram plate.

In this apparatus, on the other hand, a liquid crystal display, a CRT (cathode ray tube), etc. are used as the projector unit to project two-dimensional images such as road maps, TV programs, etc. in addition to various vehicle information. However, since it is not desirable to allow the driver to see TV programs during vehicle running, the TV images can be displayed only when the vehicle stop is detected. Therefore, there exists a problem in that passsengers taking rear seats cannot watch TV programs while the vehicle is running. In this connection, it may be possible to provide another CRT for only TV broadcastings within the passenger compartment. In this case, however, there exists another problem in that the passenger compartment is narrowed by two CRTs.

In addition, in the head-up display apparatus as described above, since the display unit is so arranged as to be recognized only by the driver taking a front seat, there exists another problem in that passengers taking rear seats cannot see road maps or TV programs irrespective of vehicle running or vehicle halt.

SUMMARY OF THE INVENTION

With these problems in mind, therefore, it is the primary object of the present invention to provide a head-up display apparatus for an automotive vehicle for selectively displaying various vehicle information and TV programs both recognizable for both the driver and the passengers.

To achieve the above-mentioned object, a head-up display apparatus for an automotive vehicle according to the present invention comprises: (a) first displaying means for displaying display images toward a driver taking a front seat; (b) second displaying means for displaying display images toward a passenger taking a rear seat; and (c) projecting means for selectively projecting display images toward any one of said first and second displaying means.

The first displaying means is a half mirror disposed on a dashboard, and the second displaying means is a mirror disposed at a middle portion between two front seats. The projecting means is disposed at a ceiling of the passenger compartment, for instance.

Further, the projecting means comprises: (a) a projector unit for projecting display images; (b) a pivotal reflecting mirror for reflecting display images projected from said projector unit; and (c) an actuator for actuating said pivotal reflecting mirror to a first position where display images projected from said projector unit is reflected toward said first displaying means and a second position where display images projected from said projector unit is reflected toward said second displaying means.

Further, the projecting means is driven by a control circuit including vehicle sensors, a TV receiver, a stop sensor, a park sensor, a selector switch, and a controller for connecting the vehicle sensors to the controller in response to no vehicle stop-and-park signal so that vehicle information can be projected by the projector unit or for connecting the TV receiver to the controller in response to a vehicle stop-and-park signal so that TV programs can be projected by the projector unit.

The control circuit further comprises a passenger selector switch for actuating the pivotal reflecting mirror to a second position where display images is reflected toward the second displaying means or for changing over the selector switch to display vehicle information or TV programs.

BRIEF DESCRIPTION OF THE DRAWINGS

The features and advantages of the head-up display apparatus for an automotive vehicle according to the present invention will be more clearly appreciated from the following description of the preferred embodiment of the invention taken in conjunction with the accompanying drawings in which the like reference numerals designate corresponding elements and in which:

FIG. 1A is an illustration for assistance in explaining the first state where CRT images are reflected toward a driver in the head-up display apparatus for an automotive vehicle according to the present invention;

FIG. 1B is an illustration for assistance in explaining the second state where CRT images are reflected toward a passenger in the same head-up display;

DETAILED DESCRIPTION OF THE PREFERRED EMBODIMENTS

With reference to the attached drawings, the head-up display apparatus for an automotive vehicle according to the present invention will be disclosed hereinbelow.

Figure 3:
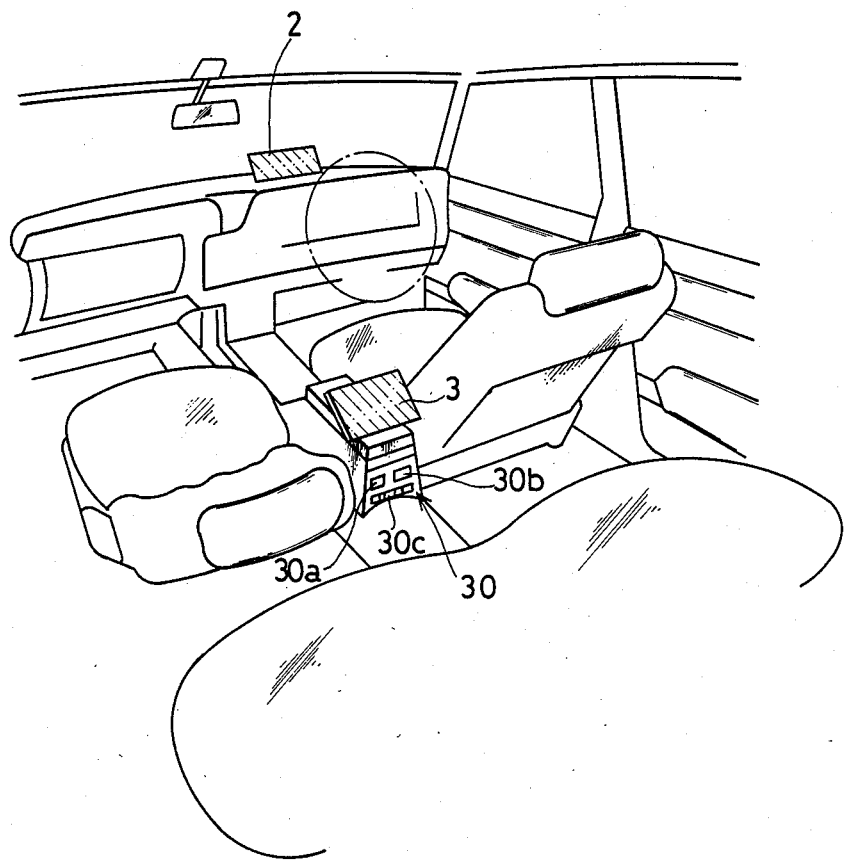
FIG. 3 is a perspective view showing the driver and passenger display units of the present invention arranged within a passenger compartment of an automotive vehicle.

The feature of the head-up display apparatus is to reflect display images projected from a projector unit 1 to a driver 4a taking a front seat via a first driver display unit 2 as shown in FIGS. 1A and 3 or to a passenger 4b taking a rear seat via a second passenger display unit 3 as shown in FIGS. 1B and 3.

Figure 2A:
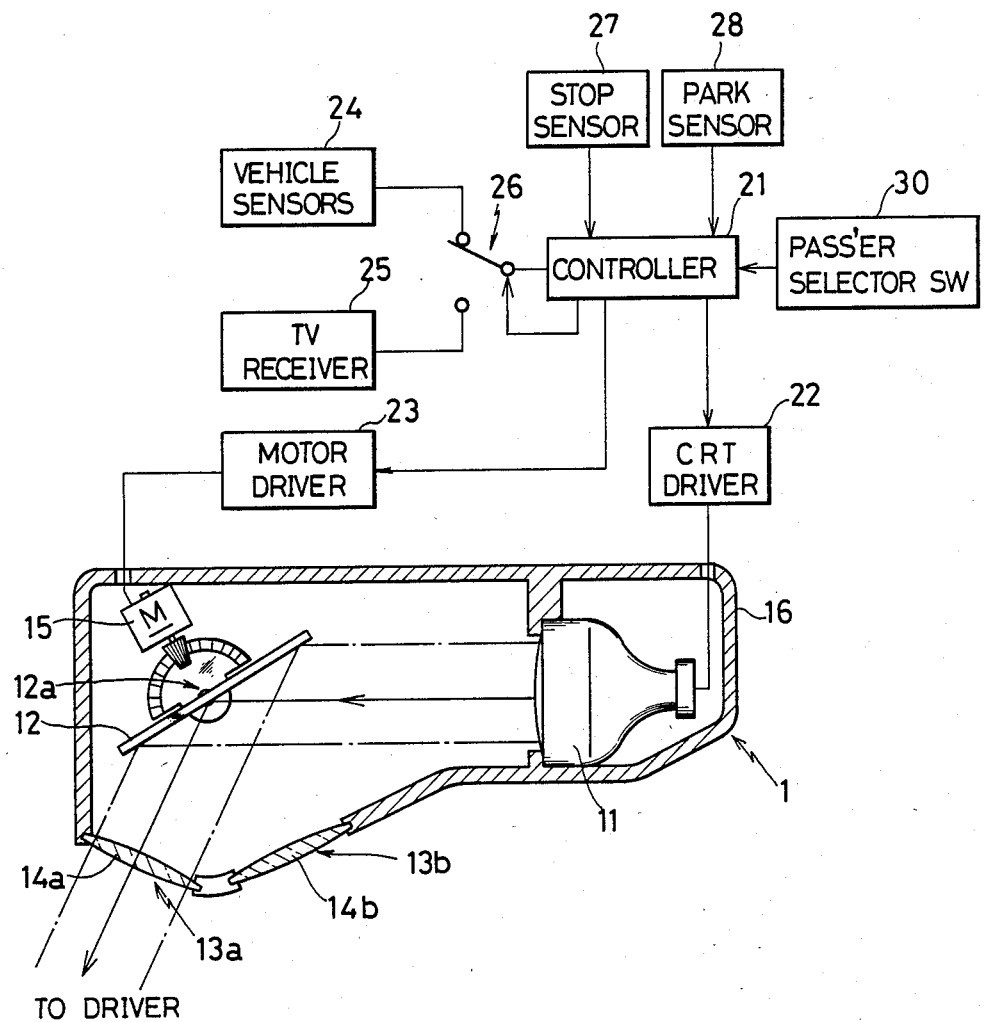
FIG. 2A is a cross-sectional view showing a projector unit of the apparatus of the present invention, including a block diagram, which indicates the first state.

To selectively project display images to the driver or the passenger, the projector unit 1 is provided with a pivotal reflector 12, as shown in FIG. 2A driven by a motor 15 controlled by a controller 21.

Figure 2B:
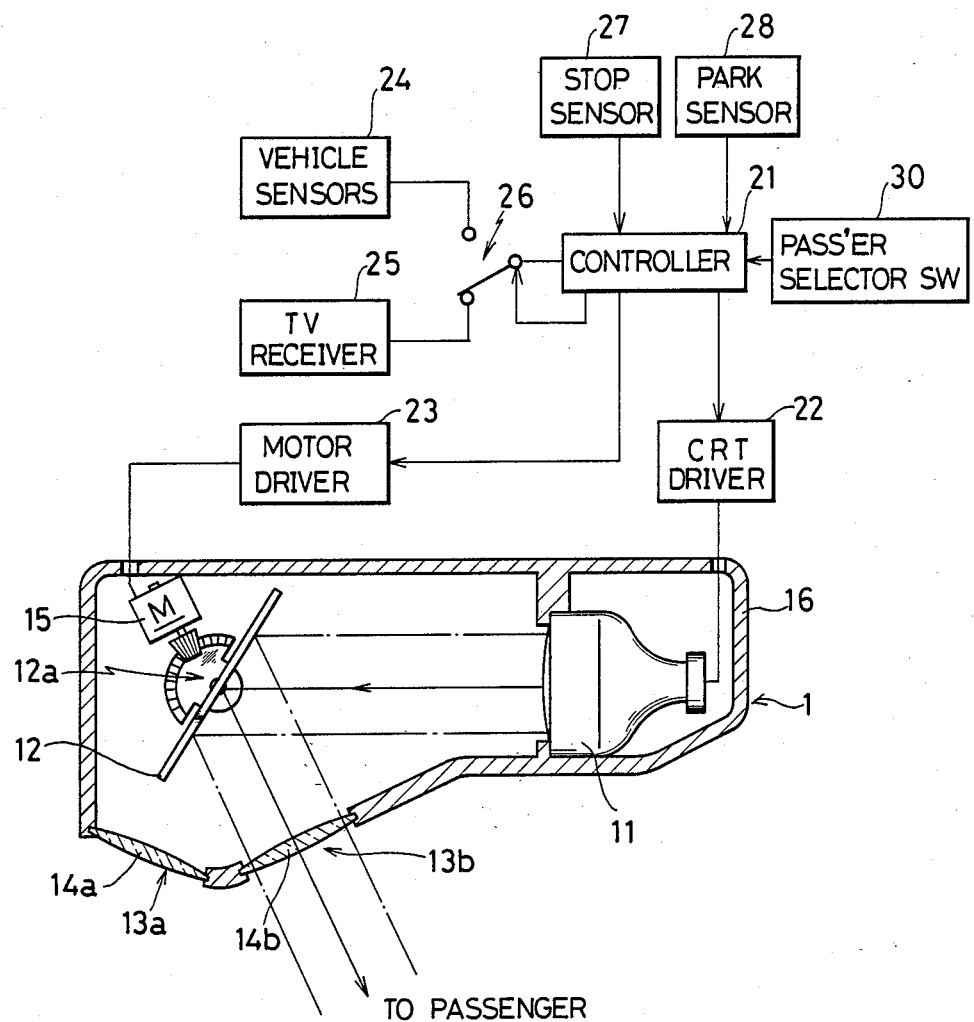
FIG. 2B is the similar view, which indicates the second state.

In FIG. 2A, the projector unit 1 comprises a CRT (cathode ray tube) 11, a mirror 12, and a motor 15, all being arranged within a projector housing 16. The mirror 12 is connected to the motor 15 via a sector bevel gear and a pinion bevel gear. Therefore, when the motor 15 is driven in either direction, the mirror 12 is pivoted from a first driver position as shown in FIG. 2A to a second passenger position as shown in FIG. 2B. Further, the housing 16 is formed with two apertures 13a and 13b at the lower portion thereof. Two projective lenses 14a and 14b are fitted to these two aperture portions 13a and 13b, respectively. Therefore, images displayed on the CRT 11 is reflected from the mirror 12 to the first driver display unit 2 through the first projective lens 13a and to the second passenger display unit 3 through the second projective lens 14a. In general, the focal length of the first projective lens 13a is relatively longer than that of the second projective lens 13b.

To selectively display various vehicle information and TV programs for both the driver and the passenger, the projector unit 1 is actuated by a control circuit as shown in FIGS. 2A and 2B.

The control circuit comprises a controller 21 (e.g. CPU including a ROM, RAM, etc.) for controlling the entire operation of the apparatus; a CRT driver 22 for controlling the output of the CRT 11; a motor driver 23 for driving the motor 15; vehicle information sensors 24 for detecting various vehicle information such as vehicle speed, fuel pump on-off operation, etc., engine speed, road map, etc.; a TV signal receiver 25, a selector switch 26 for selectively inputting the output signals of the vehicle sensors 24 or those of the TV receiver 25 to the controller 21 in response to a selector signal generated from the controller 21; stop sensors 27 for detecting vehicle stop conditions such as a side brake application, for instance; park sensors 28 for detecting vehicle park conditions such as fuel supply pump stop, for instance; and a passenger selector switch 30.

As depicted in FIGS. 1A and 1B, the projector unit 1 is fixed to the ceiling within the passenger compartment. However, without being limited thereto, it is possible to dispose the projector unit 1 at any position within the passenger compartment. In this case, it may be necessary to additionally provide an optical system to effectively guide display images from the projector unit 1 to the display units 2 and 3.

As depicted in FIG. 3, the first driver display unit 2 is a half mirror or a hologram plate disposed on the dashboard and inside the windshield. The second passenger display unit 3 is a mirror disposed on a console box at the middle portion between the two front seats. The first drive display unit 2 reflects display images from the CRT 11 to the driver 4a taking a front seat. The second passenger display unit 3 reflects display images from the CRT 11 to the passenger 4b taking a rear seat. Further, as shown in FIG. 3, the passenger selector switch 30 includes a first switch 30a for compulsorily reflect display images from the projector unit to the second display unit 3, a second switch 30b for selecting vehicle information or TV programs, and various TV set buttons for controlling the operations of the TV receiver 25.

The operation of the display apparatus of the present invention will be described hereinbelow.

(1) When the ignition switch is turned on, the selector switch 26 is automatically set to vehicle sensors 24 and further the controller 21 outputs a motor driving signal to the motor driver 23 to drive the motor 15. Therefore, the mirror 12 is positioned at a first driver position, so that the driver can see the vehicle information detected by the vehicle sensors 24 and displayed on the first driver display unit 2.

(2) When the vehicle stops and parked, the stop sensor 27 and the park sensor 28 both output signals to the controller 21, so that the selector switch 26 is set to the TV receiver 25 in response to a control signal outputted from the controller 21. Therefore, the driver can see TV programs received by the TV receiver 25 and displayed on the first driver display unit 2, only when the vehicle is stopped and further parked.

(3) When the passenger taking a rear seat turns on a first switch 30a of the passenger selector switch 30 (shown in FIG. 3), the controller 21 outputs a motor driving signal to the motor driver 23 to drive the motor 15. Therefore, the mirror 12 is positioned at a second passenger position, so that the passenger can see the vehicle information detected by the vehicle sensors 24 or TV programs received by the TV receiver 25. Either one of the vehicle information and the TV programs can be selected when the passenger changes over the second switch 30b of the passenger selector switch 30.

Further, since various TV set switches 30c (channel selector, sound volume control, etc.) are arranged in the passenger selector switch 30, the passenger can adjust the TV program receiving conditions. Further, it is preferable to reset the selected conditions of the first and second switches 30a and 30b whenever the ignition switch is turned off.

Figure 4:
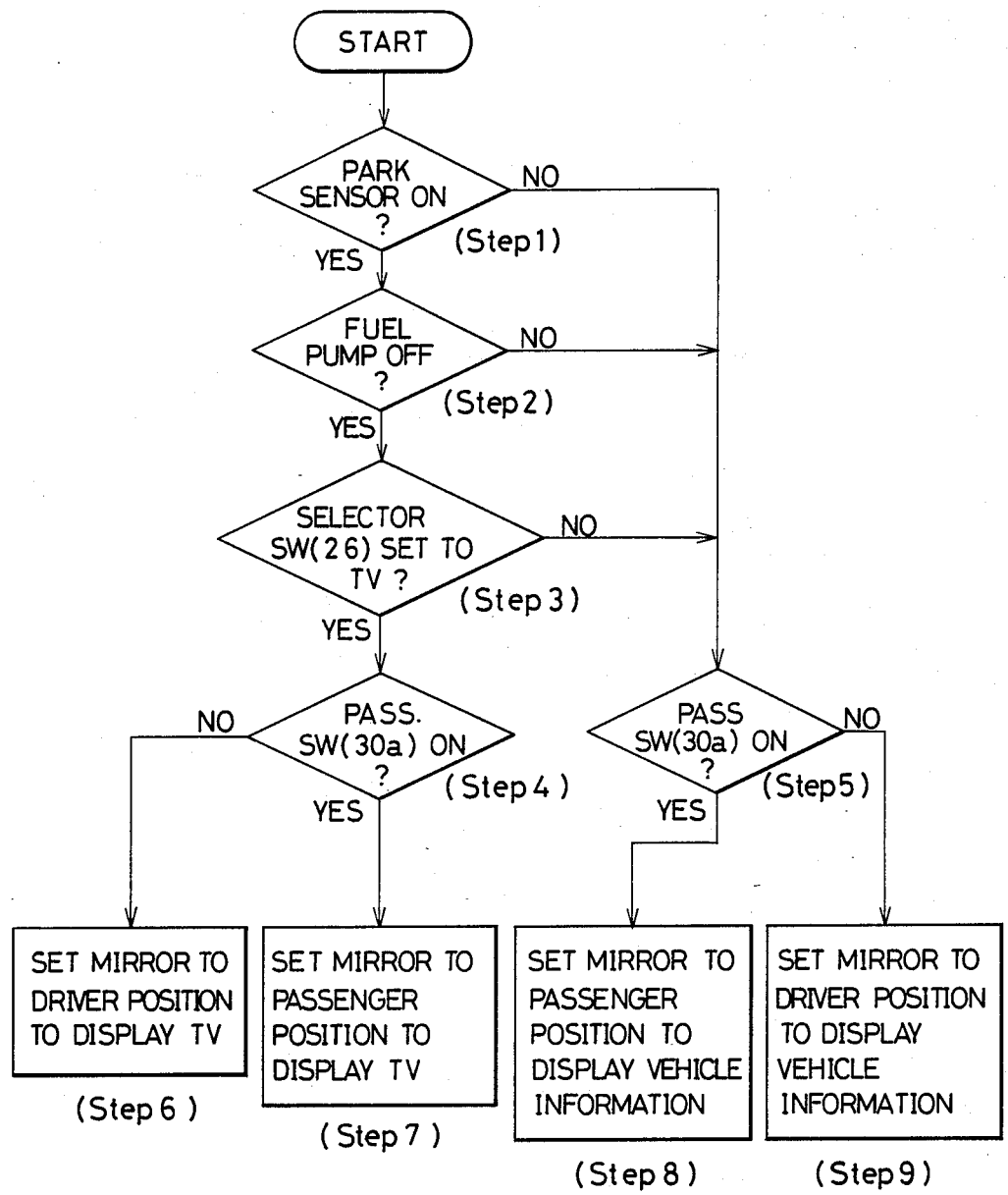
FIG. 4 is a flowchart for assistance in explaining an examplary operation of the controller.

FIG. 4 is a flowchart for assistance in explaining an exemplary operation of the controller 21 shown in FIGS. 2A and 2B. With reference to FIG. 4, control first checks whether the park sensor 28 is turned on (in step 1). If YES, control further checks whether the stop sensor 27 (e.g. the fuel pump) is turned off (in step 2). If YES, since this indicates that the vehicle is kept parked at engine halt, the selector switch 26 is to be set to the TV receiver 25. Therefore, when control determines YES (in step 3), control proceeds to step 4 to check whether the first switch 30a of the passenger selector switch 30 is turned on (in step 4). If YES, control activates the motor driver 23 to a second position at which the mirror 12 is directed to the passenger to display a TV program (in step 7). However, if NO (in step 4), control activates the motor driver 23 to a first position at which the mirror 12 is directed to the driver to display a TV program (in step 6).

Further, if the park sensor is turned off (in step 1) or the fuel pump is turned on (in step 2), the selector switch 26 is set to the vehicle sensors 24. Therefore, control determines NO (in step 3). Since this indicates that the vehicle or engine is running, the vehicle information is to be displayed. That is, control proceeds to step 5 to check whether the first switch 30a of the passenger selector 30 is turned on (in step 5). If YES, control activates the motor driver 23 to a second position at which the mirror 12 is directed to the passenger to display vehicle information (in step 8). However, if No (in step 5), control activates the motor driver 23 to a first position at which the mirror 12 is directed to the driver to display vehicle information (in step 9).

Further, although not shown in FIG. 4, where the second switch 30b of the passenger selector switch 30 is set to TV, the selector switch 26 is compulsorily set to the TV receiver 25. Where the second switch 30b is set to vehicle information (e.g. SPEED), the selector swtich 26 is compulsorily set to the vehicle sensors 24.

As described above, in the head-up display apparatus for an automotive vehicle according to the present invention, since the projector unit provided with a pivotal reflecting mirror is disposed at the ceiling of the passenger compartment and further the reflecting mirror is selectively pivoted, it is possible to selectively display images on the first driver display unit (half mirror) or on the second passenger display unit (mirror). Further, the driver can see vehicle information and TV programs (only when vehicle is kept stopped and parked), and the passenger can see both with priority.

What is claimed is:

1. A head-up display apparatus for an automotive vehicle, which comprises:
    (a) first displaying means for displaying display images toward a driver taking a front seat, said first displaying means being any one of a half mirror and a hologram plate disposed on a dashboard and inside a windshield;
    (b) second displaying means for displaying display images toward a passenger taking a rear seat, said second displaying means being a mirror disposed at about a middle position between two front seats; and
    (c) projecting means for selectively projecting display images toward any one of said first and second displaying means, said projecting means being disposed at a ceiling within a passenger compartment.

2. The head-up display apparatus for an automotive vehicle as set forth in claim 1, wherein said projecting means comprises:
    (a) a projector unit for projecting display images;
    (b) a pivotal reflecting mirror for reflecting display images projected from said projector unit; and
    (c) an actuator for actuating said pivotal reflecting mirror to a first position where display images projected from said projector unit is reflected toward said first displaying means and a second position where display images projected from said projector unit is reflected toward said second displaying means.

3. The head-up display apparatus for an automotive vehicle as set forth in claim 1, which further comprises a control circuit including:
    (a) vehicle sensors for detecting various vehicle information;
    (b) a TV receiver for receiving TV program broadcastings;
    (c) a stop sensor for detecting vehicle stop condition;
    (d) a park sensor for detecting vehicle park condition;
    (e) a selector switch coupled to said vehicle sensors and said TV receives; and
    (f) a controller, coupled to said projector unit, said actuator, said stop sensor, said park sensor, and said selector switch, for changing over said selector switch to connect said vehicle sensors to said controller, when said stop and park sensors do not detect vehicle stop-and-park conditions simultaneously, so that vehicle information can be projected by said projector unit, and to connect said TV receiver to said controller, when said stop and park sensors detect vehicle stop-and-park conditions simultaneously, so that TV programs can be projected by said projector unit.

4. The head-up display apparatus for an automotive vehicle as set forth in claim 2, which further comprises a control circuit including:
    (a) vehicle sensors for detecting various vehicle information;
    (b) a TV receiver for receiving TV program broadcastings;
    (c) a stop sensor for detecting vehicle stop condition;
    (d) a park sensor for detecting vehicle park condition;
    (e) a selector switch coupled to said vehicle sensors and said TV receives; and
    (f) a controller, coupled to said projector unit, said actuator, said stop sensor, said park sensor, and said selector switch, for changing over said selector switch to connect said vehicle sensors to said controller, when said stop and park sensors do not detect vehicle stop-and-park conditions simultaneously, so that vehicle information can be projected by said projector unit, and to connect said TV receiver to said controller, when said stop and park sensors detect vehicle stop-and-park conditions simultaneously, so that TV programs can be projected by said projector unit.

5. The head-up display apparatus for an automotive vehicle as set forth in claim 3, wherein said control circuit further comprises a passenger selector switch, coupled to said controller, for actuating said pivotal reflecting mirror to a second position where display images projected from said projector unit is reflected toward said second displaying means and for changing over said selector switch to connect said controller to said vehicle sensors or said TV receiver.

6. The head-up display apparatus for an automotive vehicle as set forth in claim 2, wherein said actuator is a motor.

7. The head-up display apparatus for an automotive vehicle as set forth in claim 2, wherein said projecting means further comprises two projective lenses disposed between said pivotal reflecting mirror and said first displaying means and between said pivotal reflecting mirror and said second displaying means, respectively.

8. The head-up display apparatus for an automotive vehicle as set forth in claim 5, wherein said passenger selector switch further comprises TV set switches.

* * * * *